United States Patent [19]

Myers, deceased et al.

[11] 4,431,515

[45] * Feb. 14, 1984

[54] CARBOMETALLIC OIL CONVERSION WITH HYDROGEN IN A RISER USING A HIGH METALS CONTAINING CATALYST

[75] Inventors: George D. Myers, deceased, late of Ashland, Ky., by Virginia K. Myers, administratrix; Lloyd E. Busch, Ashland, Ky.

[73] Assignee: Ashland Oil, Inc., Ashland, Ky.

[*] Notice: The portion of the term of this patent subsequent to Oct. 19, 1999 has been disclaimed.

[21] Appl. No.: 392,503

[22] Filed: Jun. 24, 1982

Related U.S. Application Data

[63] Continuation-in-part of Ser. No. 94,227, Nov. 14, 1979, Pat. No. 4,354,923.

[51] Int. Cl.³ .................. C10G 47/16; C10G 47/06; C10G 47/30

[52] U.S. Cl. .................. 208/108; 208/48 R; 208/52 CT; 208/111; 208/112; 208/113; 208/121

[58] Field of Search ............... 208/108, 111, 48 R, 208/52 CT

[56] References Cited

U.S. PATENT DOCUMENTS

| | | | |
|---|---|---|---|
| 2,089,616 | 8/1937 | McKee | 208/48 R |
| 2,680,706 | 6/1954 | Kilpatrick | 208/48 R |
| 2,807,571 | 9/1957 | Murphy et al. | 208/48 R |
| 2,888,395 | 5/1959 | Henny | 208/111 |
| 2,940,922 | 6/1960 | Carl et al. | 208/48 R |
| 2,946,738 | 7/1960 | Gardner et al. | 208/112 |
| 3,424,672 | 1/1969 | Mitchell | 208/164 |
| 3,560,372 | 2/1971 | Van Driesen | 208/48 R |
| 3,630,887 | 12/1971 | Mounce et al. | 208/100 |
| 3,725,247 | 4/1973 | Johnson et al. | 208/111 |
| 3,775,296 | 11/1973 | Chervenak et al. | 208/108 |
| 3,776,835 | 12/1973 | Dvoracek | 208/48 AA |
| 4,002,557 | 1/1977 | Owen et al. | 208/120 |
| 4,295,961 | 10/1981 | Fahrig et al. | 208/161 |
| 4,316,794 | 2/1982 | Schoennagel | 208/111 |
| 4,332,673 | 6/1982 | Myers | 208/120 |
| 4,341,624 | 7/1982 | Myers | 208/120 |
| 4,354,923 | 10/1982 | Myers et al. | 208/113 |

OTHER PUBLICATIONS

Shankland and Schmitkons "Determination of Activity and Selectivity of Cracking Catalyst", Proc. API 27 (III) 1947, pp. 57-77.

*Primary Examiner*—Delbert E. Gantz
*Assistant Examiner*—George Schmitkons
*Attorney, Agent, or Firm*—Richard C. Willson, Jr.; Charles A. McCrae

[57] ABSTRACT

A process for the production of high octane gasoline and/or valuable lower molecular weight products from carbometallic oils comprising contacting hydrogen and a carbometallic feed in a progressive flow reaction zone with hot conversion catalysts capable of activating hydrogen. The hydrogen gas may be introduced into the feed prior to or simultaneous with contacting the feed with catalysts. Alternately, the hydrogen gas may be introduced to the catalysts prior to or simultaneously with its contact with the carbometallic feed.

56 Claims, No Drawings

CARBOMETALLIC OIL CONVERSION WITH HYDROGEN IN A RISER USING A HIGH METALS CONTAINING CATALYST

CROSS REFERENCE TO RELATED APPLICATIONS/PATENTS

The present application is a continuation-in-part of copending U.S. patent application Ser. No. 094,227, (now U.S. Pat. No. 4,354,923) filed Nov. 14, 1979.

Patent application U.S. Pat. Nos. 094,092, 094,216, 094,217, (now U.S. Pat. Nos. 4,332,673; 4,341,624; and 4,347,122 respectively) all filed Nov. 14, 1979, and 246,791 filed Mar. 23, 1981 (now U.S. Pat. No. 4,376,038) are related applications.

U.S. Pat. No. 4,299,687 issued Nov. 10, 1981 is also related.

BACKGROUND OF THE INVENTION

The present invention relates to the field of conversion of carbometallic oils to products such as gasoline and other liquid hydrocarbon fuels usually with less coke formation produced, increased yield and selectivity, with lower gas formers, e.g. diolefins, produced, utilizing the hydrogenation potential of the accumulated metals.

An oil such as a crude oil, crude oil fraction or other oil that is particularly abundant in nickel, vanadium, and/or other heavy metals which exhibit similar behavior while also containing relatively large quantities of coke precursors, is referred to herein as a carbometallic oil, and represents a particular challenge to the petroleum refiner in his attempt to convert it into gasoline and other liquid hydrocarbon fuels.

In general, gasoline and other liquid hydrocarbon fuels boil in the range of about 100° F. (38° C.) to about 650° F. (343° C.), however, the crude oil from which these fuels are made is a diverse mixture of hydrocarbons and other compounds which vary widely in molecular weight and therefore boil over a wider range. For example, crude oils are known in which 30% to 60% or more of the total volume is composed of compounds boiling at temperatures above 650° F. (343° C.). Among these crudes are crudes in which about 10% to about 30% or more of the total volume consists of compounds which are so heavy in molecular weight that they boil above 1025° F. (552° C.), or at least will not boil below 1025° F. (552° C.) at atmospheric pressure.

Because these relatively abundant high boiling components of crude oil are unsuitable for inclusion in gasoline and other liquid hydrocarbon fuels, the Fluid Catalytic Cracking (FCC) process was developed for cracking or breaking the molecules of high molecular weight, high boiling compounds into smaller molecules which boil over an appropriate boiling range. Although the FCC process has reached a highly advanced state, and many modified forms and variations have been developed, their unifying factor is that a vaporized hydrocarbon feedstock which contains high molecular weight, high boiling components is caused to crack at an elevated temperature in contact with a cracking catalyst that is suspended in the feedstock vapors. Upon attainment of the desired molecular weight and boiling point reduction, the catalyst is separated from the desired products.

The present invention is concerned with using hydrocarbon feedstocks which have higher Ramsbottom carbon values than are indicative of acceptable FCC feedstock and thus exhibit a substantially greater potential for coke formation than does the usual FCC feedstock. In conventional FCC practice, Ramsbottom carbon values on the order of about 0.1 to about 1.0 are regarded as indicative of acceptable feed. Conventional FCC practice has employed as feedstock that fraction of crude oil which boil at about 650° F. (343° C.) to about 1000° F. (538° C.), and is relatively free of coke precursors and heavy metal contaminants. Such feedstock, known as "vacuum gas oil" (VGO), is generally prepared from crude oil by distilling off the fractions boiling below about 650° F. (343° C.) at atmospheric pressure and then separating, by further vacuum distillation from the heavier fractions, a cut boiling between about 650° F. (343° C.) and about 900° F. (482° C.) to 1025° F. (552° C.).

Since the various heavy metals in carbometallic oil are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

$$\text{Nickel Equivalents} = Ni + (V/4.8) + (FE/7.1) + (Cu/1.23)$$

The above formula can also be employed as a measure of the accumulation of heavy metals on the cracking catalyst, except that the quantity of metal employed in the formula is based on the weight of catalyst (moisture free basis) instead of the weight of feed.

The present invention is concerned with using hydrogen gas in the processing of feedstocks containing heavy metals substantially in excess of that useful in conventional FCC processing, and which therefore have a significantly greater potential for accumulating on and poisoning the catalyst.

SUMMARY OF THE INVENTION

The present invention, through the addition of hydrogen gas, is notable in providing a simple, relatively straightforward and highly productive approach to the conversion of carbometallic feeds to various lighter products, such as gasoline. The carbometallic feedstock is comprised of oil which boils above about 650° F. (343° C.). Such oil, or at least the 650° F.+ (343° C.) portion thereof, is characterized by a heavy metals content of at least about 4, preferably more than about 5, and most preferably at least about 5.5 ppm Nickel Equivalents of heavy metals by weight and by a carbon residue on pyrolysis of at least about 1% and more preferably at least about 2% by weight or more.

In accordance with the invention, the carbometallic feed, in the form of a pumpable liquid, is brought into contact with hot conversion catalyst particles capable of activating hydrogen and hydrogen gas. The feed may also be mixed with liquid water or other additional materials.

A catalyst which contains from about 3,500 to about 70,000 ppm of metals such as nickel, incremented iron, copper and/or vanadium or its oxides is referred to herein as a contaminated catalyst because such catalyst tends to encourage the formation of coke during the cracking process. Thus, in most instances, the catalyst is continuously replaced to maintain these metals in very low concentrations on the catalyst.

In the present invention, it is preferred to use a catalyst which contains these metals, especially in the above concentration range, because they are considered to have the ability to activate hydrogen, when hydrogen is introduced in the cracking system.

One mechanism which has been proposed as representing a means by which coke is formed during the catalytic cracking process is that conjugated diolefins, such as butadiene, form during the cracking process, either through dehydrogenation, or further cracking of the olefins present in the feed via carbonium ion mechanisms. The diolefins are believed to condense to form carbonaceous material, which accumulate on the catalyst, inactivating it. The overall chemical reaction can be written as follows:

In the presence of a metal contaminated catalyst, the above reaction would be expected to accelerate as do coking and other dehydrogenation reactions. However, based on Le Chatalier's principle, the presence of hydrogen in the system should tend to reverse the reaction and reduce the formation of conjugated diolefins. A retardation in the formation of conjugated diolefins inhibits fouling reactions while facilitating or enhancing other carbonium ion mechanisms thereby producing more valuable products.

A second plausible reaction, also based on Le Chatalier's principle, can be postulated which is also inhibited through the addition of hydrogen to the catalytic cracking system. Many of the metals referred to above return to the reactor as oxides and are undoubtedly reduced quickly to metals or lower valent oxides in the reactor by scavenging of the hydrogen produced in the above reaction. The driving force for such reaction, therefore, is also to the right in the above equation and this driving force may also encourage the formation of conjugated diolefins. This second hypothesis for a catalyst coking mechanism has, to our knowledge, never previously been proposed. However, by removing oxygen through the reaction of added hydrogen with the metal oxides to form water, this second potential mechanism would also be inhibited.

Thus, while not wishing to be bound by any theory, it is postulated that when hydrogen gas is added to a catalytic cracking system which contains a catalyst contaminated with metals such as nickel, copper, iron and vanadium or its oxides, the conjugated diolefin reaction is reversed, the concentration of diolefins is reduced and coke production is also reduced. In addition, olefins that would normally be converted to diolefins and be removed from the system may remain as olefins, which are then freer to interact with Bronsted acids, thereby enhancing conversion and selectivity, both of which are observed when using our invention.

The mixture of feed, catalyst, and hydrogen gas is introduced at one or more points into a progressive flow type reactor. The reactor includes an elongated reaction chamber which is at least partly vertical or inclined and in which the mixture and, to a small extent, the resultant products are maintained in contact with one another while flowing as a dilute phase or stream for a predetermined riser residence time.

At the end of the predetermined riser residence time, the catalyst is projected in a direction established by the elongated reaction chamber or an extension thereof, while the products, having lesser momentum, are caused to make an abrupt change of direction, resulting in an abrupt, substantially instantaneous ballistic separation of products from catalyst, thus avoiding uneconomical secondary cracking of product gasoline.

The separated catalyst is stripped to remove high boiling components and other entrained or absorbed hydrocarbons, and then regenerated by burning the coke in at least one regeneration zone with an oxygen-containing combustion-supporting gas under conditions of time, temperature and atmosphere sufficient to reduce the carbon on the regenerated catalyst to about 0.25% or less and preferably about 0.05% or less by weight, wherein at least the major weight portion of the coke is burned in a zone wherein the molar ratio of $CO:CO_2$ is maintained at a level of at least about 0.20 to about 0.25, more preferably at least about 0.3 and still more preferably at least about 0.5.

The regenerated catalyst is then stripped with steam to cause the catalyst to be free of entrained air, and recycled to the reactor for contact with fresh feed.

Depending on how the process of the present invention is practiced, one or more of the following advantages may be realized. Through the addition of hydrogen gas, greater cracking selectivity can be achieved. When used in conjunction with hydrogen, a high metals containing catalyst in regenerated form is also inhibited from higher coke production normally associated with high metals containing catalyst during the conversion process. Thus, considerably more gasoline is produced with less gum formers, such as diolefins. If desired, and preferably, the process may be operated with good results without prior hydrotreating of the feed and/or without other processing, such as for removal of asphaltenes or metals from the feed, and this is true even where the carbometallic oil as a whole contains more than about 4, or more than about 5 or even more than about 5.5 ppm Nickel Equivalents by weight of heavy metal and has a carbon residue on pyrolysis greater than about 1%, greater than about 1.4% or greater than about 2% by weight. Moreover, all of the converter feed, as above described, may be cracked in one and the same conversion chamber.

Heavy hydrocarbons not cracked to gasoline in a first pass may be recycled, with or without hydrotreating for further cracking in contact with the same kind of feed in which they were first subjected to cracking conditions, and under the same conditions; but operation in a substantially once-through or single pass mode (e.g. less than about 15% by volume of recycle oil based on the volume of fresh feed) is preferred.

The process as above described may be practiced in conjunction with a number of preferred alternatives, refinements or more commonly encountered conditions, a few of which will be referred to under the heading "Description of Various and Preferred Embodiments," below.

DESCRIPTION OF VARIOUS AND PREFERRED EMBODIMENTS

The present invention provides a process for the continuous catalytic conversion of a wide variety of carbometallic oils to lower molecular weight products, thereby maximizing production of highly valuable liquid products, and making it possible, if desired, to avoid vacuum distillation and other expensive treatments such as hydrotreating. The term "oils" includes not only those predominantly hydrocarbon compositions which are liquid at room temperature (i.e., 68° F. (20° C.), but also those predominantly hydrocarbon compositions which are asphalts or tars at ambient temperature but liquify when heated to temperatures in the range of up to about 800° F. (427° C.).

The present invention is also applicable to carbometallic oils, whether of petroleum origin or not. For example, provided they have similar boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude, shale oil, tar sand extract, products from coal liquifaction and solvated coal, atmospheric and vacuum reduced crude, extracts and/or bottoms (raffinate) from solvent de-asphalting, aromatic extract from lube oil refining, tar bottoms, heavy cycle oil, slop oil, other refinery waste streams, and mixtures of the foregoing. Such mixtures can for instance be prepared by mixing available hydrocarbon fractions, including oils, tars, pitches and the like. Also, powdered coal may be suspended in the carbometallic oil.

Persons skilled in the art are aware of techniques for demetalation of carbometallic oils, and demetalated oils may be converted using the present invention but it is an advantage of the present invention that it can employ as feedstock carbometallic oils that have had no prior demetalation treatment.

Likewise, the present invention can be applied to hydrotreated feedstocks, but it is an advantage of the present invention that it can successfully convert carbometallic oils which have had substantially no prior hydrotreatment.

However, the preferred application of the invention is to reduced crude, i.e., that fraction of crude oil boiling at and above 650° F. (343° C.), alone or in admixture with virgin gas-oils.

A comparison between a typical vacuum gas oil, (VGO) which has been used heretofore in FCC processes, and various reduced crudes, constituting a few examples of the many reduced crudes useable in the present invention, is made in U.S. Pat. No. 4,299,687, granted Nov. 10, 1981 upon U.S. Ser. No. 94,091 filed Nov. 14, 1979, the entire disclosure of which is hereby incorporated by reference.

In the present invention it is preferred to restrict preheating of the feed. Thus, where the nature of the feed permits, it may be fed to the reaction zone at ambient temperature. Heavier feeds may be fed to the reaction zone at preheat temperatures of up to about 600° F. (316° C.), typically about 200° F. (93° C.) to about 500° F. (260° C.), but higher preheat temperatures are not necessarily excluded.

FEEDSTOCK CHARACTERISTICS

In accordance with the invention one provides a carbometallic oil feedstock, at least about 70%, more preferably at least about 85%, and still more preferably substantially 100% (by volume) of which boils at and above about 650° F. (343° C.). All boiling temperatures used herein are based on standard atmospheric pressure conditions. Carbometallic oil partly or wholly composed of material which boils at and above 650° F. (343° C.) is referred to herein as 650° F.+ (343° C.) material; and 650° F.+ (343° C.) material which is part of or has been separated from an oil containing components boiling above and below 650° F. (343° C.) may be referred to as a 650° F.+ (343° C.) fraction. But the terms "boils above" and "650° F.+" (343° C.) are not intended to imply that all of the material characterized by those terms will have the capability of boiling.

The carbometallic oils contemplated by the present invention may contain material which may not boil under any conditions; for example, certain asphalts and asphaltenes may crack thermally during distillation, apparently without boiling. Thus, for example when it is said that the feed comprises at least about 70% by volume of material which boils above about 650° F. (343° C.), it should be understood that the 70% in question may include some material which will not boil or volatilize at any temperature. These non-boilable materials, when present, may frequently or for the most part be concentrated in portions of the feed which do not boil below about 1000° F. (538° C.), 1025° F. (552° C.) or higher. Thus, when it is said that at least about 10% more preferably about 15% and still more preferably at least about 20% (by volume) of the 650° F.+ (343° C.) fraction will not boil below about 1000° (538° C.) or 1025° F. (677° C.), it should be understood that all or any part of the material not boiling below about 1000° F. (538° C.) or 1025° F. (552° C.) may or may not be volatile at and above the indicated temperatures.

Preferably, the contemplated feeds, or at least the 650° F.+ (343° C.) material therein, have a carbon residue on pyrolysis of at least about 2 or greater. For example, the Ramsbottom carbon content may be in the range of about 2 to about 12 and most frequently at least about 4. A particularly common range is about 4 to about 8.

Preferably, the feeds have an average composition characterized by an atomic hydrogen to carbon ratio in the range of about 1.2 to about 1.9, and preferably about 1.3 to about 1.8.

The carbometallic feeds employed in accordance with the present invention, or at least the 650° F.+ (343° C.) material therein, may contain at least 4 parts per million Nickel Equivalents of heavy metals, as defined above, of which at least about 2 part per million is nickel (as metal, by weight). It should be noted that the above values for heavy metals and nickel represent time-weighted averages for a substantial period of operation of the conversion unit, such as one month, for example.

If considered necessary or desirable, the heavy metals and nickel content in the carbometallic oils processed according to the present invention may be expressed in terms of "effective metal" values. For example, see the article by Cimbalo, et al, entitled "Deposited Metals Poison FCC Catalyst," *Oil and Gas Journal,* May 15, 1972, pp 112-122, the contents of which are incorporated herein by reference. However, it is noted for purposes of the present invention, that notwithstanding the gradual reduction in poisoning activity noted by Cimbalo, et al, the regeneration of catalyst under normal RCC and/or RCC regeneration conditions may not, and usually does not, severely impair the dehydrogenation, demethanation and aromatic condensation activity of heavy metals accumulated on cracking catalyst.

It is acceptable to carry out the invention with a carbometallic oil feed having at least about 0.3%, acceptably more than about 0.8% and more acceptably at least about 1.5% by weight of sulfur in the 650° F.+ (343° C.) fraction. We have found that in the invention sulfur is able to inhibit heavy metal activity by maintaining metals such as Ni, V, Cu and Fe in their sulfide form while in the reactor. These sulfides are much less active in promoting dehydrogenation and coking reactions.

The carbometallic oils useful in the invention may and usually do contain significant quantities of compounds containing nitrogen, a substantial portion of which may be basic nitrogen. For example, the total nitrogen content of the carbometallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbometallic oils may also include significant quantities of pentane insolubles, for example at least about 0.5% by weight, and more typically about 2% or more or even about 4% or more. These may include, for instance, asphaltenes and other materials.

Careful desalting of the crude used to prepare the carbometallic feed may be important when the contemplated catalyst is particularly susceptible to alkali and alkaline earth metals. These metals remain for the most part in the "bottoms" fraction (the non-vaporized high boiling portion) of the crude. Since, reduced crude and other carbometallic oils are in many cases bottoms fractions, they may contain significant quantities of alkali and alkaline earth metals such as sodium. These metals deposit upon the catalyst during cracking. Depending on the composition of the catalyst and magnitude of the regeneration temperatures to which the catalyst is exposed, these metals may undergo interactions and reactions with the catalyst (including the catalyst support) which are not normally experienced in processing VGO under conventional FCC processing conditions.

The content of such metals (hereinafter collectively referred to as "sodium") in the feed can be maintained at about 1 ppm or less, based on the weight of the feed. Alternatively, the sodium level of the feed may be keyed to that of the catalyst, so as to maintain the sodium level of the catalyst which is in use substantially the same as or less than that of the replacement catalyst which is charged to the unit.

According to a particularly preferred embodiment of the invention, the carbometallic oil feedstock constitutes at least about 70% of material which boils above about 650° F. (343° C.), and at least about 10% of material and more likely 30% or more which boils above about 650° F. (343° C.) but will not boil below about 1025° F. (552° C.).

The average composition of this preferred 650° F.+ (343° C.) material may be further characterized by: (a) an atomic hydrogen to carbon ratio in the range of about 1.3 to about 1.8; (b) a Ramsbottom carbon value of at least about 2; (c) at least about 4 parts per million Nickel Equivalents of heavy metals, as defined above, of which at least about 2 parts per million is nickel (as metal, by weight); and (d) at least one of the following: (i) at least about 0.3% by weight of sulfur, (ii) at least about 0.05% by weight of nitrogen, and (iii), other components found in oils of petroleum and non-petroleum origin may also be present in varying quantities providing they do not prevent operation of the invention. For example, and preferably, at least about 85%, more preferably at least about 90% and most preferably substantially all of the carbometallic feed introduced into the process of the present invention is oil which has not previously been contacted with a cracking catalyst under cracking conditions.

Moreover, the process of the invention is suitable for operation in a substantially once-through or single pass mode. Thus, the volume of recycled oil, if any, based on the volume of fresh feed, is preferably about 15% or less and more preferably about 10% or less.

CATALYST CHARACTERISTICS

A particularly preferred class of catalysts includes those that are capable of activating hydrogen and that have pore structures into which molecules of feed may enter for adsorption and/or for contact with active catalytic sites within or adjacent the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts used in the present invention may include any zeolite, whether natural, semi-synthetic or synthetic, alone or in admixture with other materials which do not significantly impair the suitability of the catalyst, provided the resultant catalyst has the activity and pore structure referred to below. For example, if the catalyst is a mixture, it may include the zeolite component associated with or dispersed in a porous refractory inorganic oxide carrier; in such case the catalyst may for example contain about 1% to about 60%, more preferably about 1 to about 40% and most typically about 5 to about 40% by weight of the zeolite dispersed in the carriers, based on the total weight of catalyst (water free basis) of the porous refractory inorganic oxide alone or in combination with any of the known adjuvants for promoting or suppressing various desired and undesired reactions, some of which are discussed below.

For a general explanation of the genus of zeolite molecular sieve catalysts useful in the invention, attention is drawn to the disclosures of the articles entitled "Refinery Catalysts Are a Fluid Business" and "Making Cat Crackers Work on Varied Diet," appearing respectively in the July 26, 1978 and Sept. 13, 1978 issues of *Chemical Week* magazine. The descriptions of the aforementioned publications are incorporated herein by reference.

Examples of commercially available catalysts useful in the present invention are shown in U.S. Pat. No. 4,299,687 to George Myers, et al, incorporated above.

In general, it is preferred to employ catalysts having an overall particle size in the range of about 5 to about 160 microns, more preferably about 40 to about 120 microns, and containing a proportionately major amount in the 40 to about 80 microns range.

In general, it is preferred to employ a catalyst having a relatively high level of cracking activity and selectivity, and providing high levels of conversion and productivity at low residence times. The conversion capabilities of the catalyst may be expressed in terms of the conversion produced during actual operation or by standard catalyst activity tests. (see the classical Shankland and Schmitkons "Determination of Activity and Selectivity of Cracking Catalyst", Proc. API 27 (III), 1947, pp. 57-77.) For example, it is preferred to employ catalysts which, in the course of extended operation in the process, are sufficiently active for sustaining a level of conversion of at least about 50% or more preferably at least about 60%. In this connection, conversion is expressed in liquid volume percent, based on fresh feed.

The preferred catalyst may also be defined as one which, in its virgin or equilibrium state, exhibits a specified activity expressed as a volume percentage derived by the MAT (micro-activity test). For a discussion relating to performing MAT's, and their significance to the present invention (see U.S. Pat. No. 4,299,687, incorporated above.)

When characterized on the basis of MAT activity, the preferred catalysts may be described on the basis of their MAT activity "as introduced" into the process of the present invention, or on the basis of their "as withdrawn" or equilibrium MAT activity, or on both of these bases.

A preferred MAT activity for virgin and non-virgin catalyst "as introduced" into the process of the present invention is at least about 60%, but it will be appreciated that, particularly in the case of non-virgin catalysts supplied at high addition rates, lower MAT activity levels may be acceptable.

An acceptable "as withdrawn" or equilibrium MAT activity level of catalyst which has been used in the process of the present invention is about 20% or more, but about 40% or more and preferably about 60% or more are preferred values.

CATALYST ADDITION

In general, the weight ratio of catalyst to fresh feed (feed which has not previously been exposed to cracking catalyst under cracking conditions) used in the present invention is in the range of about 3 to about 18. Preferred ratios may be about 4 to about 12, depending on the coke forming tendencies of the feed. Within the limitations of product quality requirements, controlling the catalyst to oil ratio at relatively low levels within the aforesaid ranges tends to reduce the coke yield of the oil, based on fresh feed. Generally speaking, an effort is made to keep the coke on spent catalyst, below a level of 1.5% if possible.

Catalyst may be added continuously or periodically, such as, for example, to make up for normal losses of catalyst from the system. Moreover, catalyst addition may be conducted in conjunction with withdrawal of catalyst, such as, for example, to maintain or increase the average activity level of the catalyst in the unit or to maintain a constant amount of metal on catalyst.

For example, the rate at which virgin catalyst is added to the unit may be in the range of about 0.1 to about 3 lb/bbl or more, depending on metal content in the feed, and the level of metal allowed to reside on the equilibrium catalyst. If on the other hand equilibrium catalyst is employed, a replacement rate as high as about 5 pounds per barrel or more can be practiced. Where circumstances are such that the conditions in the unit tend to promote more rapid deactivation, one may employ rates of addition greater than those stated above; but in the opposite circumstances, lower rates of addition may be employed.

METAL-ON-CATALYST

The invention may be practiced with catalyst bearing accumulations of heavy metals which heretofore would have been considered quite intolerable in conventional FFC-VGO operations. Operation of the invention with catalyst bearing heavy metals accumulations in the range of about 3,000 to about 70,000 ppm heavy metals, on the average, is contemplated. More specifically, the accumulation may be in the range of about 4,000 to about 50,000 ppm and more likely in the range of 5,000 to about 30,000 ppm. The foregoing ranges are based on parts per million of heavy metal, including nickel, vanadium, incremental iron (that additional iron accumulated while being used) and copper, in which the metals are expressed as metal, by weight, measured on and based on regenerated equilibrium catalyst, i.e. previously used catalyst. For example, one might employ equilibrium catalyst from another unit, for example, an FCC unit which has been used in the cracking of a feed, e.g. vacuum gas oil, having a carbon residue on pyrolysis of less than 1 and containing less than about 4 ppm Nickel Equivalents of heavy metals.

In the event that catalyst of adequate activity is available, making very high rates of catalyst replacement feasible, carbometallic oil could be converted to lower boiling liquid product with catalyst bearing less than 3,000 ppm of heavy metals. In any event, the equilibrium concentration of heavy metals in the circulating inventory of catalyst can be controlled (including maintained or varied as desired or needed) by manipulation of the rate of catalyst addition discussed above, its being appreciated that limitations exist with regard to the work of any catalyst utilized in this process in relationship to the value achieved in upgrading reduced crude and the cost of replacement catalyst.

CATALYST PROMOTERS

The catalyst composition may also include one or more combustion promoters which are useful in the subsequent step of regenerating the catalyst. In order to restore the activity of the catalyst, coke is burned off in a regeneration step, in which coke is converted to combustion gases including carbon monoxide and/or carbon dioxide. Various substances are known which, when incorporated into a cracking catalyst in small quantities, tend to promote conversion of coke to carbon monoxide and/or carbon dioxide. Promoters of combustion to carbon monoxide tend to lower the temperature at which a given degree of coke removal can be attained, thus diminishing the potential for thermal deactivation of the catalyst.

Such promoters, normally used in effective amounts ranging from a trace up to about 10% to 20% by weight of catalyst, may, for example, be of any type which generally promotes combustion of carbon under regenerating conditions.

ADDITIONAL MATERIALS

The amount of additional materials which may be present in the feed may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 to about 0.3 and most preferably about 0.05 to about 0.25.

When liquid water, recycled from the regeneration step, is added to the reaction zone as an additional material, either already admixed with the feed or separately, a preferred embodiment is to have hydrogen sulfide dissolved therein within the above ranges, based on the total amount of feed. Alternatively, about 500 ppm to about 5000 ppm of hydrogen sulfide should be dissolved in the recycled liquid water. Hydrogen sulfide gas, in the above weight ratio ranges, may also be added as the additional material instead of hydrogen sulfide dissolved in recycled liquid water.

REACTION CONDITIONS

Conversion Temperature

The conversion of carbometallic oil to lower molecular weight products may be conducted at a temperature of about 900° F. (482° C.) to about 1400° F. (760° C.), measured at the reaction chamber outlet. The reaction temperature as measured at said outlet is more preferably maintained in the range of about 925° F. (496° C.) to about 1300° F. (704° C.), still more preferably about 950° (510° C.) to about 1200° F. (649° C.), and most preferably about 960° F. (516° C.) to about 1150° F. (621° C.).

The temperature at which the catalyst is fed to the reactor may vary widely or example from about 1100° F. (593° C.) to about 1600° F. (871° C.), more preferably about 1200° F. (649° C.) to about 1500° F. (816° C.) and most preferably about 1250° F. (677° C.) to about 1400° F. (760° C.).

Conversion Pressures

The feed partial pressure relative to the total pressure in the riser may be in the range of about 0.2 to about 0.8, more typically about 0.3 to about 0.7 and still more typically about 0.4 to about 0.6.

The total pressure in the reactor may range from about 10 to about 50 psia, preferably 15 to about 35 psia and more preferred about 20 to about 35 psia.

Riser Residence Time

A residence time in the reactor of 20 seconds or less, more preferably in the range of about 0.5 to about 4 seconds is permissible. It is believed that a residence time in the range of 1.0 to about 3.0 seconds is the optimum, and preferable range.

Catalyst Separation

When practicing the process of the present invention with ballistic separation of catalyst and vapors at the downstream end of a progressive flow type riser, such as is taught in U.S. Pat. Nos. 4,066,533 and 4,070,159 to Myers et al, the disclosures of which are hereby incorporated by reference, the riser residence time and the catalyst contact time are substantially the same for major portions of the feed and product vapors.

However, depending upon whether there is slippage between the catalyst and hydrocarbon vapor in the riser, the catalyst riser residence time may or may not be the same as that of the vapor. Thus, the ratio of average catalyst reactor residence time versus vapor reactor residence time, i.e. slippage, may be in the range of about 1 to about 5, more preferably about 1 to about 4, and most preferably about 1.1 to about 3, with about 1.2 to about 2 being the preferred range.

It is considered advantageous if the vapor riser residence time and vaporcatalyst contact time are substantially the same for at least about 80%, more preferably about 90% and most preferably at least about 95% by volume of the total feed and product vapors passing through the riser.

THROUGHPUT CHARACTERISTICS

It is preferred to carry out the process of the present invention with a very small ratio of catalyst (measured by weight) to daily plant throughput.

For purposes of this disclosure, daily plant throughput is defined as the number of barrels of fresh feed boiling above about 650° F. (343° C.) which a plant processes per average day of operation to produce liquid products boiling below about 430° F. (221° C.). More specifically, it is preferred to carry out the process of the present invention with an inventory of catalyst that is sufficient to contact the feed for the desired residence time in the catalyst to oil ratio range indicated above, while minimizing the amount of catalyst inventory, relative to plant throughput, which is undergoing circulation or being held for treatment in other phases of the process such as, for example, stripping, regeneration and the like. Thus, it is preferred to carry out the process of the present invention with about 2 to about 15 and more preferably about 12 tons of catalyst inventory or less per thousand barrels of daily plant throughput although the process may be practiced with using 2 to about 30 tons of catalyst per 1000 barrels of daily throughput.

Regeneration of the Catalyst

In common with conventional FCC operations on VGO, the present invention includes stripping of spent catalyst after disengagement of the catalyst from product vapors. Persons skilled in the art are acquainted with appropriate stripping agents and conditions for stripping spent catalyst, but in some cases the present invention may require somewhat more severe conditions than are commonly employed.

It is preferred to prevent or restrict contact between stripping vapors and catalyst accumulations in the catalyst disengagement or collection chamber. This may be done for example by preventing such accumulations from forming, e.g. with the exception of a quantity of catalyst which essentially drops out of circulation and may remain at the bottom of the disengagement and/or collection chamber, the catalyst that is in circulation may be removed from the chamber promptly upon settling to the bottom of the chamber.

Catalyst Regeneration Temperature

Regeneration of catalyst may be performed at any suitable temperture in the range of about 1100° F. (593° C.) to about 1600° F. (871° C.), measured at the catalyst regenerator outlet. This temperature is preferably in the range of about 1200° F. (649° C.) to about 1500° F. (816° C.), more preferably in the range of about 1250° F. (677° C.) to about 1425° F. (774° C.) and optimally about 1275° F. (691° C.) to about 1375° F. (746° C.). The process has been operated, for example, with a fluidized regenerator with the temperature of the catalyst dense phase in the range of about 1275° F. (691° C.) to about 1400° F. (760° C.).

Also, to minimize regeneration temperatures and demand for regeneration capacity, it may be desirable to employ conditions of time, temperature and atmosphere in the stripper which are sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas ($H_2S$ containing), hydrogen and others. The stripper may be operated at a temperature of about 900° F. (482° C.) or higher. Stripping operations in which the temperature of the spent catalyst is raised to higher temperatures are also contemplated within the scope of the present invention.

Carbon Removal

In order to maintain adequate activity in zeolite and non-zeolite catalysts, it is desirable to regenerate the catalyst under conditions of time, temperature and atmosphere sufficient to reduce the percent by weight of carbon remaining on the catalyst to about 0.25% or less, whether the catalyst bears a large heavy metals accumulation or not. Preferably this weight percentage is about 0.1% or less and more preferably about 0.05% or less, especially with zeolite catalysts. The term coke, when used to describe the present invention, should be understood to include any residual unvaporized feed or cracking product, if any such material is present on the catalyst after stripping.

The substantial levels of conversion taught by the process of the present invention may and usually do result in relatively large yields of coke, such as for example about 4% to about 17% by weight based on fresh feed, more commonly about 6% to about 14% and most frequently about 6% to about 12%. The coke yield can more or less quantitatively deposit upon the catalyst.

At contemplated catalyst to oil ratios, the resultant coke laydown may be in excess of about 0.3%, more commonly in excess of about 0.5% and very frequently in excess of about 1% of coke by weight, based on the weight of moisture free virgin or regenerated catalyst. Such coke laydown may range as high as about 2%, or about 3%, or even higher, although coke in the range of about 0.5 to about 1.5% is more commonly experienced.

Regeneration Atmosphere

According to a preferred embodiment of the present invention, the sub-process of regeneration, as a whole, may be carried out to the above-mentioned low levels of coke on regenerated catalyst with a deficiency of oxygen; more specifically, the total oxygen supplied to the one or more stages of regeneration discussed below can be and preferably is less than the stoichiometric amount which would be required to burn all hydrogen in the coke to $H_2O$ and to burn all carbon in the coke to $CO_2$ and to burn all sulfur in the coke to $SO_2$. If the coke includes other combustibles, the aforementioned stoichiometric amount can be adjusted to include the amount of oxygen required to burn them.

The present invention also uses the technique of controlling or restricting the heat transmitted to fresh feed via recycled regenerated catalyst while maintaining a specified ratio between the carbon dioxide and carbon monoxide formed in the regenerator during the period when such gases are in heat exchange contact or relationship with catalyst undergoing regeneration.

Regeneration Zone

In general, all or a major portion by weight of coke present on the catalyst immediately prior to regeneration is removed in at least one combustion zone in which the aforesaid ratio $CO:CO_2$ is controlled as described below. More particularly, at least the major portion, preferably at least about 65%, and more preferably at least about 80% by weight of the coke on the catalyst is removed in a combustion zone in which the molar ratio of $CO_2$ to CO is maintained at a level substantially below 5, e.g. about 4 or less. Looking at the $CO_2/CO$ relationship from the inverse standpoint, it is preferred that the $CO/CO_2$ molar ratio should be at least about 0.3 and still more preferably about 1 or more or even 1.5 or more. While persons skilled in the art are aware of techniques for inhibiting the burning of CO to $CO_2$, in the past, it has been suggested that the mole ratio of $CO:CO_2$ should be kept less than 0.2 when regenerating catalyst with substantial heavy metal accumulations resulting from the processing of carbometallic oils; see for example U.S. Pat. No. 4,162,213 to Zrinscak, Sr., et al.

Multi-stage regeneration offers the possibility of combining oxygen deficient regeneration with control of the $CO:CO_2$ molar ratio and equally importantly still providing means by which to remove coke on catalyst to a level of 0.25% or lower, and preferably 0.05% or lower. Thus, about 50% or more, preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above.

In combination with the foregoing, the last 5% or more, or 10% or more by weight of the coke originally present, up to the entire amount of coke remaining after the preceding state or stages, can be removed in a subsequent stage of regeneration in which more oxygen is present. Such process is susceptible of operation in such a manner that the total flue gas recovered from the entire, completed regeneration operation contains little or no excess oxygen, i.e. on the order of about 0.2 mole percent of less, or as low as about 0.1 mole percent or less.

Where the regeneration conditions, e.g. temperature, is substantially less severe in the second zone that in the first zone (e.g. by at least about 10 and preferably at least about 20° F. ($-8°$ C.), that part of the regeneration sequence which involves the most severe conditions is performed while there is still an appreciable amount of coke on the catalyst. Such operation may provide some protection of the catalyst from the more severe conditions.

A particularly preferred embodiment of the present invention is two-stage fluidized regeneration at a maximum temperature of about 1500° F. (816° C.) with a reduced temperature of at least about 10° F. ($-12°$ C.) or 20° F. ($-8°$ C.) in the dense phase of the second stage as compared to the dense phase of the first stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration was as much as about 1% or greater.

Examples of multi-stage regeneration processes are described in U.S. patent application Ser. No. 969,602 to Geroge D. Meyers, et al, filed Dec. 14, 1978, the entire disclosure of which is hereby incorporated by reference, and by U.S. Pat. No. 2,398,739.

Still another particularly preferred technique for controlling or restricting the regeneration heat imparted to fresh feed via recycled catalyst involves the diversion of a portion of the heat borne by recycled catalyst to the additional material, discussed above.

In most circumstances, it will be important to insure that no absorbed oxygen containing gases are carried into the riser by recycled catalyst. Thus, whenever such action is considered necessary, the catalyst discharged from the regenerator may be stripped with appropriate stripping gases to remove oxygen containing gases. Such stripping may for instance be conducted at relatively high temperatures, for example about 1250° F. (677° C.) to about 1370° F. (743° C.), using steam, nitrogen or other inert gas(es) as the stripping gas(es). The use of nitrogen or other inert gases is beneficial from the standpoint of avoiding a tendency toward hydrothermal catalyst deactivation which may result from the use of steam.

APPARATUS

It is preferred that present invention be practiced in a progressive flow type reactor such as that taught in U.S. Ser. No. 094,092 (now U.S. Pat. No. 4,332,673) filed Nov. 14, 1979 and allowed on Nov. 17, 1981 and U.K. patent application GB No. 2,063,294A filed Nov. 12, 1980, the full disclosure of each being hereby incorporated by reference.

EXAMPLES

Although the following examples are not intended to be the sole embodiments of the present invention, Tables I-VII, containing Examples 1-19, are included.

Tables I-V contain Product Distribution Unit reports using various feedstocks, the characteristics of which are shown on each table, and various equilibrium catalysts, wherein the feedstock was cracked with and without hydrogen gas. Where hydrogen gas was added, the amount, in Standad Cubic Feet per Barrel, is indicated in parentheses.

Examples 1-4 of Table I compare the effect of hydrogen gas on the crackability of an Arabian Light (ABL) reduced crude, having the properties set forth therein, using a high metals equilibrium catalyst which is regenerated according to the process taught herein. Examples 1 and 4 are run with steam only and Examples 143 SCF/BBL of hydrogen is added to example 2; 267 SCF/BBL is added to example 4.

As can be seen from Table I, the $C_5$-430° F. cut for Examples 2 and 3 ranges from about 2 to about 8 volume percent higher, with coke production of 0.63% and 4.0%, respectively, lower, than that of Examples 1 and 4. The selectivity increase ranges from 3.55 to 9.88 volume percent for the same Examples, thereby demonstrating that the addition of hydrogen gas to the riser using a high metals catalyst capable of activating hydrogen resulted in a considerably higher production of gasoline, lower coke production and higher selectivity.

Examples 5 and 6 of Table II compare the effect of hydrogen gas on the crackability and selectivity of the same ABL reduced crude using a low metals catalyst adding steam alone (Example 5) and adding steam plus hydrogen (Example 6). The results show that with a low metals catalyst only slight improvements in gasoline production were observed in that the $C_5$-430° F. cut in Example 6 was about 0.69 volume percent higher than that of Example 5 with coke production of Example 6 being 1.76 weight percent less than that of Example 5. The selectivity of Example 6 increased 1.58 over that of Example 5. This table serves to illustrate that crackability and selectivity improvement are better affected by hydrogen gas with a high metals catalyst capable of activating hydrogen rather than a low metals containing catalyst.

Table III, containing Examples 7-9, shows the results of cracking a wholly reduced crude feedstock, which is a blend of Arabian Light (ABL), Mayan (MAY), Isthmus (ITH), and Vaccum Gas Oil (VGO). Example 7 was run without hydrogen addition, whereas Examples 8 and 9 were run with 130 SCF/BBL of hydrogen gas. The results show that the $C_5$-430° F. cut for Examples 8 and 9 were on the order of 10 volume percent higher, with coke production of 1 and 4.26 weight percent, respectively, lower, than example 7. The selectivity for Examples 8 and 9 is 15.78 volume percent higher than that for Example 8, thereby confirming that a reduced crude feed, cracked by a high metals catalyst, capable of activating hydrogen, and hydrogen gas produces higher gasoline yield, lower coke production, and greater selectivity.

Table IV, containing Examples 10-11, shows the results of cracking an Arabian Light Vaccuum Gas Oil, using a low metals catalyst, and steam addition (Example 10) and a low metals catalyst with steam plus hydrogen at 130 SCF/BBL (Example 11). The $C_5$-430° F. cut for Example 11 is 1.22 volume percent higher than that for Example 10, and the coke production is 0.42 weight percent higher. The selectivity of Example 11 is 3.61 volume percent higher than Example 10. This table confirms the results of Tables I-III.

Table V, containing Examples 12 and 13, shows the result of cracking a feedstock which is a blend of vacuum gas oil and reclaimed asphalt, which would be a reduced crude with the meaning of the present invention, using steam (Example 12) and steam plus 130 SCF/BBL hydrogen gas (Example 13). The $C_5$-430° F. cut for Example 13 was 6.26 volume percent higher than that of Example 12, with a reduction of coke produced to 2.47 weight percent. The selectivity of Example 13 was about 9.1 volume percent higher than that of Example 12. These data illustrate that, for a low metals catalyst to be of benefit in cracking a carbometallic oil of the type discussed in the present invention, the catalyst must have a very high relative activity. Note that the high metals catalyst of Tables I and III have relative activities of 55 MAT units, whereas the catalysts of Tables II, IV and V have relative activities of 89 MAT units.

Table VI, showing Examples 14 and 15, contains experiments performed in a 200 B/D demonstration unit using a GRZ-1 catalyst in which no hydrogen (Example 14) was added and with 150 SCF/BBL hydrogen gas added (Example 15). In Example 14, the GRZ-1 catalyst contains 15,700 ppm of Ni+V and the catalyst of Example 15, contains 16,400 ppm of Ni+V. As can be seen from Table VI, the yield of gasoline was increased by 1.2 Vol. % and conversion by 2.4 Vol. %, through $H_2$ addition.

Table VII, containing Examples 16-19, shows additional data obtained in further experiments with a second catalyst, Octex, also run in the 200 B/D demonstration unit, with a mixed blend of reduced crudes, the properties of which are shown in Table VII. As can be seen, a significant increase in highly valuable gasoline was also obtained in these experiments, amounting to as much as 4.4 Vol. % in Example 19.

TABLE I

PRODUCT DISTRIBUTION UNIT REPORT

| Catalyst GR2-1 (approx 89%) | |
|---|---|
| Mat. Conv. Activity | 70 |
| Rel. Activity | 55 |
| Metals on catalyst, ppm | 8600V, 2400Ni, 3600Fe |

FEED PROPERTIES FOR ABL REDUCED CRUDE

| | |
|---|---|
| °API Gr. | 20.0 |
| Ramsbtm. Carbon | 6.0 |
| Sulfur, wt % | 2.5 |
| N, ppm, total/basic | 1500/— |
| Heptane insol. | 2.3 |
| Metals in Feed | <1Cu, 9Ni, 30V, 4Fe, 14Na |
| Dist., °F., 5%/50%/90% | 554/810/Coke at 82% |

| | Examples # | | | |
|---|---|---|---|---|
| | 1 | 2 | 3 | 4 |
| Test # | 188 | 189 | 190 | 191 |
| Conditions, °F. | 1000 | 1000 | 1000 | 1000 |
| Cat./Oil | 6.6 | 6.3 | 6.1 | 6.3 |
| Whsv | 18.3 | 19.2 | 19.6 | 19.1 |
| Rx Atmos | Stm | Stm + $H_2$ (143) | Stm + $H_2$ (267) | St |
| Product Distribution | Vol % | Vol % | Vol % | Vol % |
| $H_2$ | 0.27[1] | 0.50[1] | 0.75[1] | 0.36[1] |
| $C_1$ | 1.24[1] | 0.97[1] | 1.20[1] | 1.43[1] |
| $C_2$ | 1.65[1] | 1.48[1] | 1.33[1] | 2.59[1] |
| $C_3^=$ | 3.76 | 3.10 | 2.76 | 4.26 |
| $C_3$ | 6.41 | 5.56 | 5.04 | 6.48 |
| $iC_4$ | 12.16 | 9.79 | 8.49 | 11.51 |
| $iC_4^= + 1\text{-}C_4^=$ | 2.47 | 2.34 | 2.07 | 2.47 |
| $mC_4$ | 2.84 | 2.23 | 2.04 | 2.87 |
| $2\text{-}C_4^=(c,t)$ | 2.90 | 2.90 | 2.44 | 2.77 |
| $CO_1CO_2COS_1H_2S$ | 0.37[1] | 0.36[1] | 0.27[1] | 0.56[1] |
| $C_5$-430° F. | 56.66 | 58.49 | 64.04[2] | 55.45 |
| 430–630° F. | 16.73 | 16.47 | 15.79 | 15.22 |
| >630° F. | 6.32 | 7.75 | 7.52 | 7.11 |
| Coke | 12.97[1] | 13.42[1] | 12.60[1] | 13.67[1] |
| Conv. of >430° F., Vol % | 76.95 | 75.78 | 76.69 | 77.67 |
| Sel., $C_5$-430° F., Vol % | 73.63 | 77.18 | 83.51 | 71.39 |

[1]Expressed in Wt %
[2]Results Suspected

TABLE II

PRODUCT DISTRIBUTION UNIT REPORT

| Catalyst - SDx | |
|---|---|
| Mat. Conv. Activity | 74 |
| Rel. Activity | 89 |
| Metals on catalyst, ppm | 2100V, 1000Ni, 4100Fe |

FEED PROPERTIES FOR ABL REDUCED CRUDE

| | |
|---|---|
| °API Gr. | 20.0 |
| Ramsbtm Carbon | 6.0 |
| Sulfur, wt % | 2.5 |
| N, ppm, Total/basic | 1500/— |
| Heptane Insol. | 2.3 |
| Metals in feed, ppm | <1Cu, 9Ni, 30V, 4Fe, 14Na |
| Dist. of 5%/50%/90% | 554/810/Coke at 82% |

| | Example # | |
|---|---|---|
| | 5 | 6 |
| Test # | 113 | 183 |
| Conditions, of | 1000 | 1000 |
| Cat./Oil | 6.9 | 6.5 |
| Whsv | 17.5 | 18.5 |
| Rx Atmos | Stm | Steam + $H_2$ (130) |
| Product Distribution | Vol % | Vol % |
| $H_2$ | 0.32[1] | 1.22[1] |
| $C_1$ | 2.29[1] | 1.22[1] |
| $C_2$ | 2.68[1] | 2.30[1] |
| $C_3^=$ | 6.30 | 5.25 |
| $C_3$ | 7.90 | 9.93 |
| $iC_4$ | 11.68 | 14.00 |
| $iC_4^= + 1\text{-}C_4^=$ | 2.28 | 3.15 |
| $MC_4$ | 3.66 | 3.85 |
| $2\text{-}C_4^=(c,t)$ | 2.51 | 3.75 |
| $Co_2Co_2COS,H_2S$ | 0.71[1] | 0.09[1] |
| $C_5$-430° F. | 48.99 | 49.68 |
| 430–630° F. | 13.93 | 14.86 |
| >630° F. | 8.04 | 7.95 |
| Coke | 13.75[1] | 11.99[1] |
| Conv. of >430° F., Vol % | 78.03 | 77.19 |
| Sel., $C_5$-430° F., Vol % | 62.78 | 64.36 |

[1]Expressed in Wt %

TABLE III

PRODUCT DISTRIBUTION UNIT REPORT

| Catalyst GRZ-1 (approx 89%) | |
|---|---|
| Mat. Conv. Activity | 70 |
| Rel. Activity | 55 |
| Metals on catalyst, ppm | 8600V, 2400Ni, 3600Fe |
| Feedstock Reduced Crude made from: | |
| 31.5 ABL/15.2 May/14.8 ITH/38.5 VGO | |
| °API Gr. | 20.1 |
| Ramsbtm Carbon | 4.7 |
| Sulfur, wt % | 1.95 |
| N, ppm, Total/Basic | 1800/480 |
| Heptane Insol. | 3.56 |
| Metals in feed ppm | <1Cu, 16Ni, 61V, 5Fe, 1Na |
| Dist. of 5%/50%/90% | 556/819/Coke |

| | Examples | | |
|---|---|---|---|
| | 7 | 8 | 9 |
| Test # | 126 | 153 | 156 |
| Conditions, of | 1000 | 1000 | 1000 |
| Cat./Oil | 6.8 | 7.03 | 7.31 |
| Whsv | 17.7 | 16.5 | 16.4 |
| Rx Atmos | Stm | Stm + $H_2$ | Steam + $H_2$ (130) |
| Product Distribution | Vol % | Vol % | Vol % |
| $H_2$ | 0.98[1] | 0.70[1] | 0.60[1] |
| $C_1$ | 1.92[1] | 1.23[1] | 0.97[1] |
| $C_2$ | 2.93[1] | 1.47[1] | 1.58[1] |
| $C_3^=$ | 7.62 | 3.46 | 3.67 |
| $C_3$ | 9.98 | 5.49 | 7.11 |
| $iC_4$ | 12.10 | 9.86 | 14.11 |
| $iC_4^= + 1\text{-}C_4^=$ | 3.48 | 1.79 | 2.28 |
| $MC_4$ | 3.65 | 2.72 | 2.88 |
| $2\text{-}C_4^=(c,t)$ | 3.54 | 2.19 | 2.62 |
| $CO_2CO_2COS,H_2S$ | 0.85[1] | 0.25[1] | 0.46[1] |
| $C_5$-430° F. | 43.95 | 53.91 | 54.55 |
| 430–630° F. | 12.46 | 15.55 | 15.64 |
| >630° F. | 9.28 | 9.51 | 8.53 |
| Coke | 15.33[1] | 14.33[1] | 11.07[1] |
| Conv. of >430° F., Vol % | 78.26 | 74.94 | 75.83 |
| Sel., $C_5$-430° F., Vol % | 56.16 | 71.94 | 71.94 |

[1]Expressed in Wt %

TABLE IV

PRODUCT DISTRIBUTION UNIT REPORT

| Catalyst | Sdx |
|---|---|
| Mat Conv. Activity | 74 |
| Rel. Activity | 89 |
| Metals on catalyst, ppm | 2100V, 1000Ni, 4100Fe |
| Feedstock | ABL VAC GAS OIL |
| °API Gr. | 26.7 |
| Rams Carbon | 0.29 |
| Sulfur, wt % | unknown |
| N, ppm, Total/Basic | unknown |
| Heptane Insol. | unknown |
| Metals in feed | unknown |
| Dist. of 5%/50%/95% | 626/745/905 |

| | Example # | |
|---|---|---|
| | 10 | 11 |
| Test # | 159 | 160 |
| Conditions, of | 1000 | 1000 |
| Cat./Oil | 6.8 | 6.8 |
| Whsv | 17.7 | 17.7 |
| Rx Atmos | Steam | Steam + $H_2$ (130) |
| Product Distribution | Vol % | Vol % |
| $H_2$ | 0.07[1] | 0.57[1] |
| $C_1$ | 0.72[1] | 0.85[1] |
| $C_2$ | 1.47[1] | 1.52[1] |

TABLE IV-continued

PRODUCT DISTRIBUTION UNIT REPORT

| | | |
|---|---|---|
| $C_3$ | 3.97 | 4.05 |
| $C_3$ | 7.62 | 7.80 |
| $iC_4$ | 14.19 | 13.38 |
| $iC_4^=$ + $1-C_4^=$ | 2.71 | 2.59 |
| $mC_4$ | 3.71 | 3.51 |
| $2-C_4^=$(c,t) | 3.26 | 3.10 |
| $CO_2Co_2COS,H_2S$ | 0.30[1] | 0.25[1] |
| $C_5$-430° F. | 55.01 | 56.23 |
| 430–630° F. | 16.05 | 15.60 |
| >630° F. | 8.10 | 7.52 |
| Coke | 5.40[1] | 5.92[1] |
| Conv. of >430° F., Vol % | 75.85 | 75.88 |
| Sel., $C_5$-430° F., Vol % | 72.53 | 76.14 |

[1]Expressed in Wt %

TABLE V

PRODUCT DISTRIBUTION UNIT REPORT

| Catalyst | Sdx | |
|---|---|---|
| Mat. Conv. Activity | 74 | |
| Rel. Activity | 89 | |
| Metals on catalyst, ppm | 2100V, 1000Ni, 4100Fe | |
| Feedstock | 50% Vac Gas Oil/50% Reclaimed Asphalt (J.N.) | |
| °API Gr. | 17.1 | |
| Rams Carbon | unknown | |
| Sulfur, wt % | unknown | |
| N, ppm, Total/Basic | unknown | |
| Heptane Insol. | unknown | |
| Metals in feed | unknown | |

| | Example | |
|---|---|---|
| | 12 | 13 |
| Test # | 155 | 157 |
| Conditions, of | 1000 | 1000 |
| Cat./Oil | 6.8 | 6.5 |
| Whsv | 17.6 | 18.5 |
| Rx Atmos | Steam | Steam + $H_2$ (130) |
| Product Distribution | Vol % | Vol % |
| $H_2$ | 0.37[1] | 0.66[1] |
| $C_1$ | 2.53[1] | 2.41[1] |
| $C_2$ | 2.82[1] | 2.37[1] |
| $C_3$ | 7.00 | 5.14 |
| $C_3$ | 9.50 | 8.24 |
| $iC_4$ | 14.47 | 3.21 |
| $iC_4^=$ + $1-C_4^=$ | 2.66 | 2.53 |
| $mC_4$ | 4.32 | 0.99 |
| $2-C_4^=$(c,t) | 2.82 | 2.69 |
| $CO_2CO_2COS, H_2S$ | 0.65[1] | 0.81[1] |
| $C_5$-430° F. | 44.47 | 50.73 |
| 430–630° F. | 11.28 | 12.20 |
| >630° F. | 5.89 | 6.99 |
| Coke | 21.09[1] | 18.62[1] |
| Conv. of >430° F., Vol % | 82.83 | 80.81 |
| Sel., $C_5$-430° F., Vol % | 53.69 | 62.78 |

[1]Expressed in Wt %

TABLE VI

RUN ON RCC TEST UNIT
EFFECT OF $H_2$ WITH A HIGH METALS CATALYST

| | Example # | |
|---|---|---|
| | 14 | 15 |
| Test # | 284 | 285 |
| Feedrate B/D | 186.0 | 189.9 |
| Feed Temp. °F | 405 | 395 |
| Reactor Temp. °F. | 980 | 980 |
| Regen. - lower | 1289 | 1231 |
| Regen. - upper | 1306 | 1211 |
| $H_2O$ Rate % | 3.3 | 3.3 |
| Steam Rate | 8.9 | 8.8 |
| $H_2$ Addn. SCF/BBL | none | 150 |
| Cat/Oil | 10.4 | 12.5 |
| Res. Time | 2.25 | 2.25 |
| Feed P.P. | 8.2 | 8.5 |
| $CO_2$/CO | 3.5 | 2.9 |

TABLE VI-continued

| Yields | | |
|---|---|---|
| Dry Gas Wgt. % | 4.8 | 4.2 |
| $C_3$ Sta. Vol. % | 3.6 | 3.6 |
| $C_3^=$ Vol. % | 9.8 | 9.6 |
| $C_4$ Sat. Vol. % | 8.5 | 9.7 |
| $C_4^=$ Vol. % | 8.2 | 9.1 |
| $C_5$ - 430° F. Vol. % | 46.4 | 47.6 |
| LCO 430–630° F. | 7.2 | 8.1 |
| Slurry Oil | 18.4 | 15.7 |
| Coke Wgt. % | 11.9 | 12.1 |
| Conversion | 74.4 | 76.8 |
| Catalyst | GRZ-1 Special (RCC #1) | GRZ-1 Special (RCC #1) |
| Ni + V | 16,400 | 15,700 |
| Crude | West Texas Interm. | West Texas Interm. |

PROPERTIES OF WEST TEXAS INTERMEDIATE

| °API Gravity | 22.0 |
|---|---|
| Ramsbottom Carbon | 4.4 |
| $C_7$ Insol. | 1.39 |
| Total Nitrogen ppm | 1600 |
| Basic Nitrogen ppm | 660 |
| Sulfur Wgt. % | 0.77 |
| Copper ppm | <1 |
| Nickel ppm | 12 |
| Vanadium | 25 |
| Iron | 5 |
| Sodium | 3 |

TABLE VII

RUN ON RCC TEST UNIT
EFFECT OF $H_2$ WITH A HIGH METALS CATALYST

| | Example | | | |
|---|---|---|---|---|
| | 16 | 17 | 18 | 19 |
| Test | 291 | 292 | 293 | 294 |
| Feed Rate | 166 | 173 | 168 | 167 |
| Feed Temp. °F. | 374 | 374 | 374 | 374 |
| Reactor Temp. °F. | 960 | 960 | 960 | 980 |
| Lower Regen. Temp. °F. | 1323 | 1323 | 1315 | 1315 |
| Upper Regen. Temp. °F. | 1324 | 1314 | 1300 | 1300 |
| Reactor Pres. Prig. | 15 | 15 | 15 | 15 |
| $H_2O$ Rate % | 2.23 | 2.09 | 2.34 | 2.11 |
| Steam Rate % | 9.11 | 8.51 | 8.35 | 8.29 |
| $H_2$ SCF/BBL | none | 230 | 230 | 230 |
| Cat/Oil Ratio | 8.2 | 7.8 | 8.7 | 8.9 |
| Res. Time Sec. | 2.41 | 2.17 | 2.18 | 2.19 |
| Feed Partial Pres. | 8.4 | 7.6 | 7.5 | 7.0 |
| Dry Gas Wgt. % | 3.8 | 4.6 | 3.5 | 4.0 |
| $C_3$ Sat. Vol. % | 2.6 | 2.1 | 2.2 | 1.9 |
| $C_3$ Olefin Vol. % | 10.9 | 10.1 | 8.2 | 8.1 |
| $C_4$ Sat. Vol. % | 6.6 | 6.0 | 5.6 | 5.2 |
| $C_4$ Olefin Vol. % | 11.8 | 11.0 | 10.3 | 10.4 |
| $C_5$ - 430° F. Vol. % | 53.2 | 53.9 | 57.1 | 57.6 |
| LCO 430–630° F. Vol. % | 11.3 | 11.4 | 11.2 | 12.2 |
| Slurry Oil Vol. % | 9.1 | 9.1 | 9.3 | 8.5 |
| Coke | 12.2 | 12.2 | 12.9 | 13.0 |
| Conversion | 79.6 | 79.5 | 79.5 | 79.3 |
| Select. | 66.8 | 67.7 | 71.8 | 72.7 |
| Catalyst | | Octex | | |
| Ni + V ppm | 8700 | 9000 | 9000 | 9500 |
| Crude | | Mixed Blend | | |

PROPERTIES OF THE MIXED BLEND

| °API Gravity | 18.7 |
|---|---|
| Ramsbottom Carbon | 7.2 |
| $C_7$ Insol. | 3.3 |
| Total Nitrogen ppm | 1800 |
| Basic Nitrogen ppm | 700 |
| Sulfur Wgt. % | 1.90 |
| Copper ppm | 1 |
| Nickel ppm | 18 |
| Vanadium ppm | 67 |
| Iron ppm | 5 |
| Sodium ppm | 2 |
| Distn. | |
| 5% °F. | 563 |
| 10% | 645 |
| 50% | 905 |
| 60% | 967 |

TABLE VII-continued cc @ 991° F.

What is claimed is:

1. A process for economically converting carbometallic oils to lighter products, comprising:
   a. providing a converter feed containing 650° F.+ (343° C.) material, said 650° F.+ (343° C.) material being characterized by a carbon residue on pyrolysis of at least about 1 and by containing at least about 4 parts per million Nickel Equivalents of heavy metal;
   b. simultaneously contacting said converter feed with $H_2$ and a hot cracking catalyst bearing substantially more than 600 parts per million of heavy metals contaminants which are capable of activating hydrogen to form a stream comprising a suspension of said catalyst and said $H_2$ in said feed and causing the resulting stream to flow through a progressive flow type reactor having an elongated reaction chamber which is at least in part vertical or inclined for a vapor riser residence time in the range of about 0.5 to about 10 seconds at a temperature of about 900° F. (482° C.) to about 1400° F. (760° C.) and under a pressure of about 10 to about 50 pounds per square inch absolute sufficient for causing a conversion per pass in the range of about 50% to about 90% while producing coke in amounts in the range of about 6% to about 14% by weight based upon fresh feed, and laying down coke on the catalyst in amounts in the range of about 0.3% to about 3% by weight to produce cracking products and coked catalyst;
   c. separating said coked catalyst from said cracking product;
   d. stripping absorbed hydrocarbons from said coked catalyst;
   e. regenerating said coked catalyst by burning said coke in at least one regeneration zone with an oxygen-containing combustion-supporting gas while forming combustion products comprising CO and/or $CO_2$;
   f. stripping said regenerated catalyst with an inert gas; and
   g. recycling said stripped catalyst for contact with fresh feed.

2. The process of claim 1 wherein the concentration of said hydrogen gas is in the range of 10 to 500 SCF/BBL.

3. The process of claim 1 wherein the concentration of said hydrogen gas is in the range of 50 to 350 SCF/BBL.

4. The process of claim 1 wherein said $H_2$ is provided from a gas stream containing 80% or more $H_2$.

5. The process of claim 1 wherein said $H_2$ is provided from a gas stream containing at least about 60% $H_2$ in said source.

6. The process of claim 1, 2, 3, or 4 wherein $H_2$ is brought together with said catalyst prior to contact of said catalyst with said converter feed.

7. The process of claim 1 in which said catalyst is regenerated to contain less than 0.25% coke.

8. The process of claim 1 wherein said catalyst is regenerated to contain less than 0.05% coke.

9. The process of claim 1 wherein said coked catalyst is regenerated with a resulting gas containing a $CO/CO_2$ ratio in the range of about 0.20 to 0.25.

10. The process of claim 9 wherein said $CO/CO_2$ ratio is greater than 0.25.

11. The process of claim 9 wherein the $CO/CO_2$ ratio is greater than 0.3.

12. The process of claim 1, 2, 3, 4, or 5 in which a two stage regenerator is employed.

13. A process according to claim 1, 2, 3, 4, or 5 wherein said feed comprises a Ramsbottom carbon value is in the range of about 2 to about 12.

14. A process according to claim 1, 2, 3, 4, or 5 wherein the feed as a whole contains at least about 5.5 parts per million Nickel Equivalents of heavy metal(s), of which at least about 2 parts per million is nickel (as metal by weight).

15. A process according to claim 1, 2, 3, 4, or 5 wherein said feed comprises about 15% or less by volume of recycled oil.

16. A process according to claim 1, 2, 3, 4, or 5 wherein said feed is processed in a substantially once-through or single pass mode with no substantial amount of recycled oil in the feed.

17. A process according to claim 1, 2, 3, 4, or 5 wherein said catalyst is maintained in contact with said feed in said reaction zone in a weight ratio of catalyst to feed in the range of about 3 to about 18.

18. A process according to claim 1, 2, 3, 4, or 5 wherein said process being conducted in a plant wherein the ratio between the number of barrels per day of plant throughput and the total number of tons of catalyst undergoing circulation throughout all phases of said process is in the range of about 2 to about 30 tons of catalyst per thousand barrels of daily plant throughput.

19. A process according to claim 1, 2, 3, 4, or 5 wherein said process being conducted in a plant wherein the ratio between the number of barrels per day of plant throughput and the total number of tons of catalyst undergoing circulation throughout all phases of the process is about 2 tons of catalyst or less per thousand barrels of daily plant throughput.

20. A process according to claim 1, 2, 3, 4, or 5 wherein said catalyst is added to said process at a rate in the range of about 0.1 to about 3 pounds per barrel of feed.

21. A process according to claim 1, 2, 3, 4, or 5 wherein there is an accumulation of heavy metals on said catalyst in the range of about 3500 ppm to about 70,000 ppm Nickel Equivalents, by weight measured on regenerated equilibrium catalyst.

22. The process of claim 1, 2, 3, 4, or 5 wherein said $H_2$ is injected into said converter feed prior to contacting said converter feed with said catalyst.

23. The process of claim 1, 2, 3, 4, or 5 wherein said $H_2$ is injected into said feed prior to contact of said feed with said cracking catalyst.

24. The process of claim 1, 2, 3, 4, or 5 wherein said $H_2$ is injected into said feed prior to contact with said cracking catalyst.

25. The process of claim 1, 2, 3, 4, or 5 wherein said $H_2$ is brought together simultaneously with said feed and said cracking catalyst.

26. The process of claim 1, 2, 3, 4, or 5 in which said cracking catalyst contains more than 800 ppm of heavy metal.

27. The process of claim 1, 2, 3, 4, or 5 wherein said cracking catalyst contains greater than 2000 ppm of nickel plus vanadium.

28. The process of claim 1, 2, 3, 4, or 5 wherein said cracking catalyst contains between about 800 and 50,000 parts per million of heavy metal.

29. The process of claim 1, 2, 3, 4, or 5 wherein said cracking catalyst contains greater than 5,000 ppm nickel plus vanadium.

30. The process according to claim 1, 2, 3, 4, or 5 wherein said cracking catalyst contains greater than 10,000 ppm Nickel plus Vanadia.

31. The process of claim 1, 2, 3, 4, or 5 wherein said cracking catalyst contains greater than 15,000 ppm Nickel plus Vanadia.

32. Process of claim 1, 2, 3, 4, or 5 wherein said cracking catalyst has a MAT activity greater than 10.

33. The process of claim 1, 2, 3, 4, or 5 in which said cracking catalyst has a MAT greater than 50.

34. The process of claim 1, 2, 3, 4, or 5 wherein said cracking catalyst has a MAT greater than 60.

35. The process of claim 1, 2, 3, 4, or 5 wherein said cracking catalyst has a MAT in the range of 10 to about 60.

36. The process of claim 1, 2, 3, 4, or 5 wherein the amount of said $H_2$ added to said reactor is greater than twice the stoichiometric oxygen content as oxides of nickel, vanadium, iron and copper on said regenerated catalyst.

37. The process according to claim 1 in which said 650° F.+ (343° C.) material represents at least about 70% by weight of said feed.

38. A process according to claim 1 or 10 wherein the 650° F.+ (343° C.) material includes at least about 10% by volume of material which will not boil below 1000° F. (538° C.).

39. The process according to claim 1, 2, 3, 4, 5, or 10 in which the 650° F.+ (343° C.) material includes at least about 10% by volume of material which will not boil below 1025° F. (552° C.).

40. The process according to claim 1, 2, 3, 4, 5, or 10 wherein said carbon residue on pyrolysis corresponds to a Ramsbottom carbon value in the range of about 2 to about 12.

41. The process according to claim 1, 2, 3, 4, 5, 9, or 10 wherein said carbon residue on pyrolysis of said feed as a whole corresponds to a Ramsbottom carbon value of at least about 1.

42. The process according to claim 1, 2, 3, 4, 9, or 10 wherein said metal in said feed is greater than 5 ppm nickel plus vanadium plus iron plus copper.

43. The process according to claim 1, 2, 3, 4, 9, or 10 wherein the metals in said feed are greater than 10 ppm, nickel plus vanadium plus iron plus copper.

44. The process according to claim 1, 2, 3, 4, 9, or 10 wherein the metals in said feed are greater than 20 ppm, nickel plus vanadium plus iron plus copper.

45. The process according to claim 1, 2, 3, 4, 9, or 10 wherein the metals in said feed are greater than 50 ppm, nickel plus vanadium plus iron plus copper.

46. The process according to claim 1, 2, 3, 4, 9, or 10 wherein the metals in said feed are greater than 100 ppm, nickel plus vanadium plus iron plus copper.

47. The process according to claim 2, 3, 4, 9, or 10 wherein said feed comprises about 15% or less by volume of recycled oil.

48. The process according to claim 1, 2, 3, 4, 9, or 10 wherein said catalyst is maintained in contact with said feed in said reactor zone in a weight ratio of catalyst to feed in the range of about 3 to about 18.

49. A process for catalytically cracking a metal-contaminated residual oil feedstock containing components that do not boil below about 1025° F. (552° C.), greater than 15 ppm Nickel+Vanadium and at least 200 ppm basic nitrogen, which comprises: contacting said feedstock in a riser cracking zone in the presence of about 5–20 wt % water based on feed with hydrogen gas and a regenerated cracking catalyst, at a temperature in the range of 1300° F. (704° C.) to 1500° F. (816° C.), said catalyst being characterized by a metals content greater than 5,000 ppm, Nickel plus Vanadium and having a carbon content less than about 0.10 wt %, to form cracked products and deactivating said catalyst while said catalyst accumulates metal contaminants and hydrocarbonaceous deposits; separating said deactivated catalyst from said cracked products; recovering said cracked products; regenerating said separated, deactivated catalyst in said regeneration zone under conditions to produce a CO rich flue gas and provide a regenerated cracking catalyst having less than about 0.10 wt % residual carbon, at a temperature in the range of 1300° F. (704° C.) to 1500° F. (816° C.), and recycling said regenerated catalyst to said cracking zone.

50. A process of claim 49 wherein said cracked products comprises a $C_5$-430° F. endpoint fraction having a Research Octane Number above 90 as measured without octane-enhancing additives.

51. A process for catalytically cracking a carbometallic containing residual feedstock containing components boiling above 1025° F. (552° C.), greater than 15 ppm Nickel+Vanadium and at least 200 ppm basic nitrogen, which comprises: contacting said feedstock in a riser cracking zone in the presence of 5–10 wt % water based on feed with hydrogen gas and a fluidized, regenerated cracking catalyst characterized by a metal content greater than 5,000 ppm Nickel equivalents and having a carbon content less than 0.1 wt %, thereby forming cracked products and coked catalyst; said cracked products containing gasoline being characterized by an octane value greater than 90 neat and containing oxygenated compounds; separating said coked catalyst from said cracked products by separation means such that less than 1% of the coked catalyst is carried over to a product separation means; passing said separated coked catalyst to a two-stage regeneration zone; regenerating said coked catalyst in a two-stage regeneration zone with an oxygen-containing gas at 1400° F. (760° C.) or higher such that 75% or more of the coke is removed in the first or upper stage and the contact time in the second or lower stage is less than one-half of that in the upper stage to form said regenerated catalyst with less than 0.1 wt % residual carbon, while producing a flue gas containing a low $CO_2/CO$ ratio, preferably below 2/1, with the oxygen content in said second or lower stage being below combustion supporting levels; recycling said regenerated catalyst to said riser cracking zone with the unit in complete heat balance by the combination of water addition to the riser, low feed preheat, low oxygen utilization, and low thermal output per pound of coke, thereby selectively forming liquid cracked products.

52. A process for catalytically cracking a metal-contaminated residual oil feedstock containing components that do not boil below about 1025° F. (552° C.), greater than 15 ppm Nickel+Vanadium and at least 200 ppm basic nitrogen, which comprises: contacting said feedstock in a riser cracking zone in the presence of about 5–15 wt % water based on feed, hydrogen gas, and a regenerated cracking catalyst characterized by a metals content greater than 5,000 ppm Nickel plus Vanadium and having a carbon content less than about 0.10 wt % at a temperature in the range of 1300° F. (704° C.) to 1500° F. (816° C.) to form cracked products and deactivating said catalyst with metal contaminants and hydrocarbonaceous deposits; separating said deactivated catalyst from said cracked products; recovering said cracked products; passing said separated, deactivated catalyst to a regeneration zone; contacting said deactivated catalyst in said regeneration zone under conditions to produce a CO rich flue gas and provide a regenerated cracking catalyst having less than about 0.10 wt % residual carbon at a temperature in the range of 1300° F. (704° C.) to 1500° F. (816° C.), and recycling said regenerated catalyst to said cracking zone.

53. A process for catalytically cracking a carbometallic containing residual feedstock containing components boiling above 1025° F. (552° C.), greater than 15 ppm nickel+vanadium and at least 200 ppm basic nitrogen, which comprises: contacting said feedstock in a riser cracking zone in the presence of 5-20 wt % water based on feed with hydrogen gas and a fluidized, regenerated cracking catalyst characterized by a metal content greater than 5,000 ppm Nickel Equivalents and having a carbon content less than about 0.1 wt %, thereby forming cracked products containing gasoline being characterized by an octane value greater than 90 neat and by containing oxygenated compounds; separating said coked catalyst from said cracked products by separation means such that less than 1% of the coked catalyst is carried over to the product separation means passing said separated coked catalyst to a two-stage regeneration zone; contacting said coked catalyst in said two-stage regeneration zone with an oxygen-containing gas at 1400° F. (760° C.) or higher such that about 75% or more of the coke is removed in the first or upper stage and the contact time in the second or lower stage is less than one-half of that in the upper stage to form a regenerated catalyst with less than 0.1 wt % residual carbon with the production of a flue gas containing a low $CO_2/CO$ ratio, preferably below 2/1, and wherein said oxygen content in said oxygen-containing gas is below combustion supporting levels; recycling said regenerated catalyst to said riser cracking zone with the unit in complete heat balance by the combination of water addition to the riser, low feed preheat, oxygen utilization, and low thermal output per pound of coke from the two-stage regenerator, thereby selectively forming liquid cracked products.

54. A process according to claim 49, 50, 51, 52 or 53 wherein said water additionally comprises hydrogen sulfide.

55. A process according to claim 53 wherein the concentration of said hydrogen sulfide is in the range of about 500 to about 5000 ppm.

56. A process according to claim 53 wherein the ratio of said hydrogen sulfide in said feed as a whole is in the range of about 0.05 to about 0.4.

* * * * *